(No Model.)

L. F. SHANOVSKI & B. RUBENSTEIN.
FOOD HOLDER FOR BIRD CAGES.

No. 502,146. Patented July 25, 1893.

WITNESSES:
Fred G. Dieterich
P. B. Turpin

INVENTORS:
L. F. Shanovski
B. Rubenstein
BY Munn & Co.
ATTORNEYS.

UNITED STATES PATENT OFFICE.

LOUIS F. SHANOVSKI AND BARNET RUBENSTEIN, OF CHICAGO, ILLINOIS.

FOOD-HOLDER FOR BIRD-CAGES.

SPECIFICATION forming part of Letters Patent No. 502,146, dated July 25, 1893.

Application filed March 10, 1893. Serial No. 465,380. (No model.)

*To all whom it may concern:*

Be it known that we, LOUIS F. SHANOVSKI and BARNET RUBENSTEIN, of Chicago, in the county of Cook and State of Illinois, have invented a new and useful Improvement in Bird-Cages, of which the following is a specification.

This invention is an improved food holder for bird cages designed to securely hold, lumps of sugar, crackers, slices of apple, cuttle bone, or other article it is desired to secure to the cage convenient to the bird therein; and the invention consists in the novel constructions, combinations and arrangements of parts as will be hereinafter described and claimed.

Figure 1:
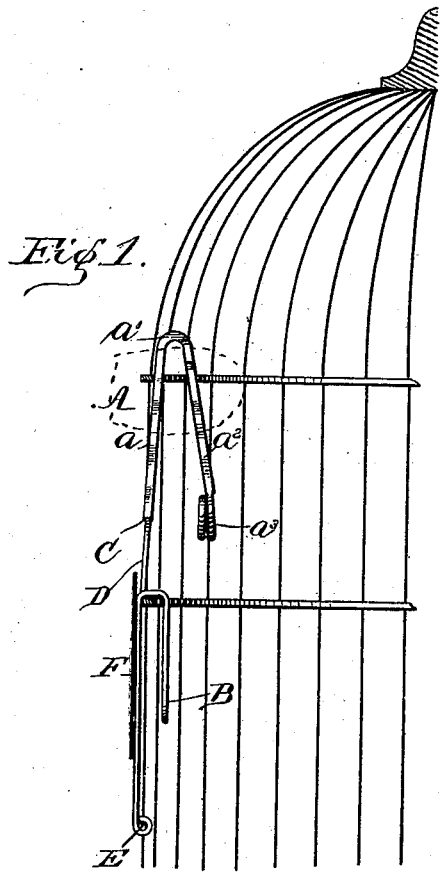
Figure 2:
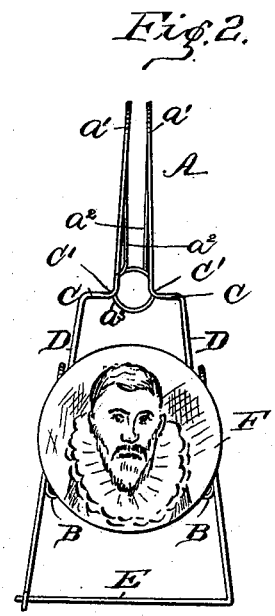
Figure 3:
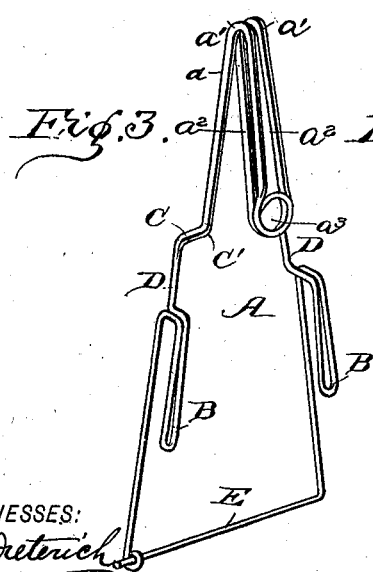
Figure 4:
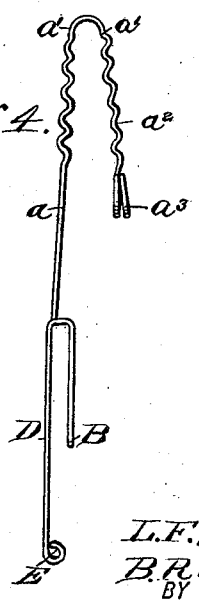

In the drawings—Figure 1 shows a part of a bird cage with the holder applied. Fig. 2 is a face view of the holder. Fig. 3 is a perspective view of the rear side of the holder, and Fig. 4 shows the corrugated form of spring clasp as will be described.

The holder is formed of a length of wire bent at the upper end to form the spring clasp A, between its ends to form the hook like hangers B which are arranged at the opposite side edges of the holder and open downward so that they will catch over the horizontal wires of a cage and secure the holder in place.

The clasp A is formed of the wire and with the front upwardly projected side lengths $a$ $a$ united at their upper ends by the curved portions $a'$ $a'$ with the inner or rear lengths $a^2$ $a^2$ which extend downward and are connected at their lower ends by the coiled portion $a^3$. The opposite lengths $a$ $a^2$ $a$ $a^2$ are arranged and adapted to clasp between them the article to be held and to better secure such article it is preferred to broaden the surfaces of the parts $a$ $a^2$ that engage the article of food. This may be preferably accomplished by flattening the parts $a$ $a^2$ as shown in Figs. 1, 2 and 3 or it may be accomplished by bending or corrugating said parts as shown in Fig. 4. At the lower ends of the parts $a$ are produced the acute bends C' leading to the short laterally extending arms C which project outwardly and join with the main side arms D which are bent between their ends to form the hook like hangers B and are joined at their lower ends by the base rod E the whole forming generally a triangular frame of which the rod E is the base. It will be noticed that the acute bend C' tends to strengthen or increase the tension of the spring clasp. A brace plate or medallion F may be arranged to connect the main side arms D and this plate may be ornamented by a head of Columbus as shown or by any other desired representation or inscription.

The application of the holder to a cage will be readily understood from Fig. 1. It is evident that the holder can be conveniently applied to and removed from any ordinary style of bird cages and it may be connected at any suitable point.

The use of our improvement avoids bending or other injury to the wire of the cage and will serve to keep the food clean and in good condition for the birds.

Having thus described our invention, what we claim as new, and desire to secure by Letters Patent, is—

1. In a food holder substantially as described a clasp A having front arms $a$ $a$ and rear arms $a^2$ $a^2$ the said arms $a$ $a$ and $a^2$ $a^2$ being separated to adapt the insertion between them of the food to be held and having the ends of the arms $a^2$ connected by a coil $a^3$ all substantially as set forth.

2. The improved holder herein described composed of wire bent to form the base rod E the main side rods D having the hook like hangers B, the lateral arms C and the clasp A, all substantially as and for the purposes set forth.

3. A holder composed of wire bent to form the base and side rods E and D and hangers B and the spring clasp A, and provided with the brace plate or medallion F connecting the side rods E E all substantially as and for the purposes set forth.

LOUIS F. SHANOVSKI.
BARNET RUBENSTEIN.

Witnesses:
HERBERT L. LANPHERE,
SAMUEL WEISBERG.